(12) United States Patent
Boyer et al.

(10) Patent No.: US 6,752,536 B2
(45) Date of Patent: Jun. 22, 2004

(54) METHOD OF SIMULTANEOUSLY POLISHING A PLURALITY OF DIVERSE FIBER OPTIC CABLE CONNECTORS

(75) Inventors: Thomas Boyer, Gambrills, MD (US); Waqar Mahmood, Columbia, MD (US); Keith Chandler, Lawrenceville, GA (US); Andrei Cspikes, Alpharetta, GA (US)

(73) Assignee: Ciena Corporation, Linthicum, MD (US)

( * ) Notice: Subject to any disclaimer, the term of this patent is extended or adjusted under 35 U.S.C. 154(b) by 397 days.

(21) Appl. No.: 09/844,583

(22) Filed: Apr. 27, 2001

(65) Prior Publication Data

US 2002/0159718 A1 Oct. 31, 2002

(51) Int. Cl.⁷ .................................................. G02B 6/36
(52) U.S. Cl. ........................................................ 385/60
(58) Field of Search .............................. 385/60, 67, 76, 385/77, 80, 85, 139, 78, 134, 147

(56) References Cited

U.S. PATENT DOCUMENTS

| | | | | |
|---|---|---|---|---|
| 5,325,452 A | * | 6/1994 | Stein et al. | 385/67 |
| 5,577,149 A | * | 11/1996 | Averbeck et al. | 385/134 |
| 6,672,772 B2 | * | 1/2004 | Gimbel et al. | 385/60 |

* cited by examiner

*Primary Examiner*—Son V. Nguyen
(74) *Attorney, Agent, or Firm*—Michael R. Cammarata; James M. Olsen; Chad J. Billings

(57) ABSTRACT

A method that mass polishes a variety of fiber optic cable connectors simultaneously. The method includes a plurality of steps for mass polishing of fiber optic cable connectors with varying patterns and loci of motion to prevent overlap of patterns during polishing. Thus, fiber optic cable connectors having a variety of polished end faces may be provided with the apparatus. The method also eliminates the potential for contamination among polishing films, reduces polishing steps, and saves labor and maintenance costs.

24 Claims, 6 Drawing Sheets

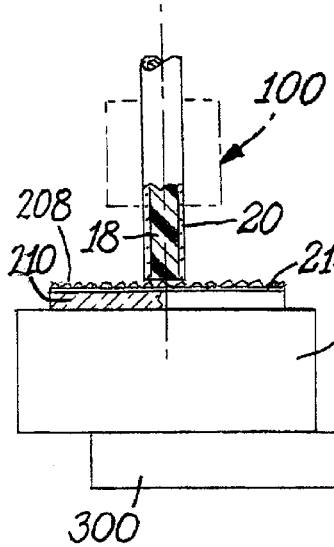
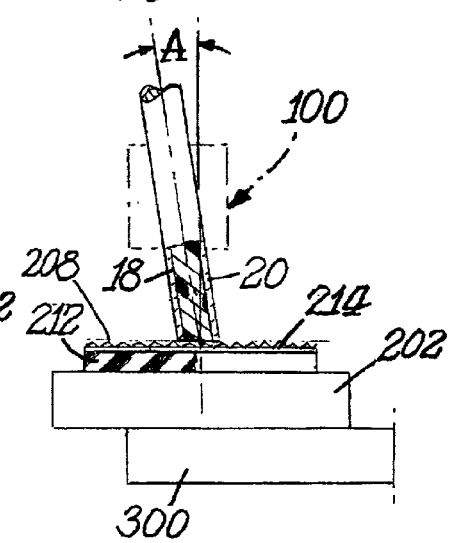
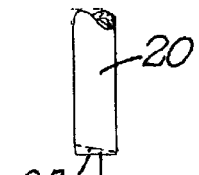
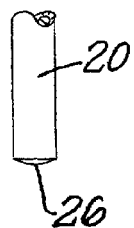
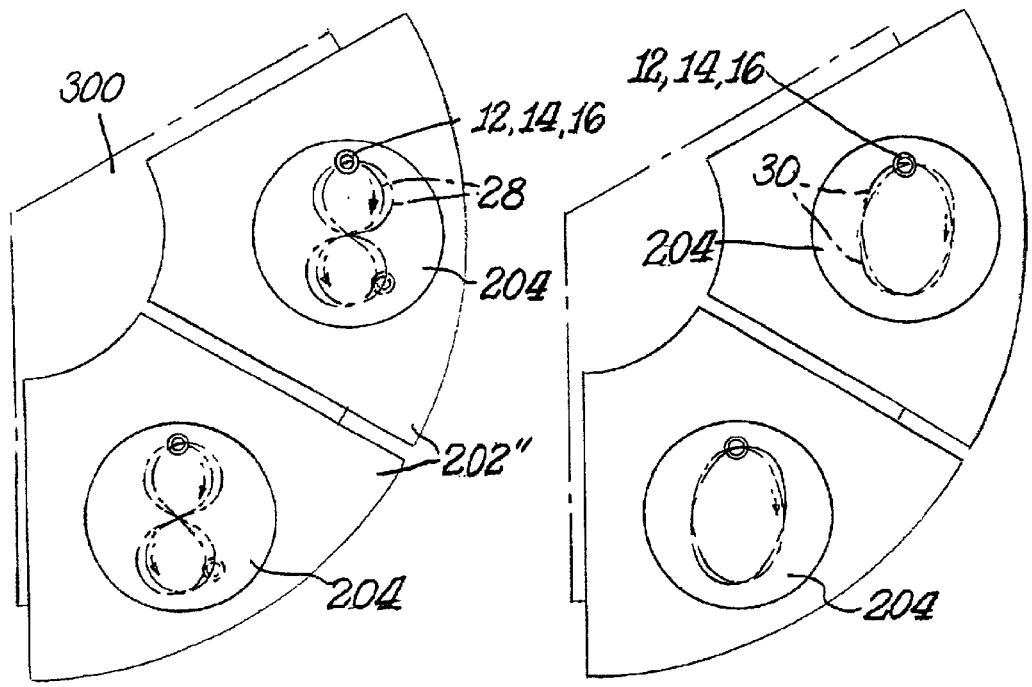

METHOD OF SIMULTANEOUSLY POLISHING A PLURALITY OF DIVERSE FIBER OPTIC CABLE CONNECTORS

BACKGROUND OF THE INVENTION

A. Field of the Invention

The present invention relates generally to the communications field, and, more particularly to a hybrid polishing apparatus for polishing fiber optic cable connectors and method of polishing the same.

B. Description of the Related Art

Interconnection devices are used to join a fiber optic cable to another fiber optic cable or a fiber optic component. The most common interconnection device is the connector. Types of fiber optic cable connectors are as various as the applications in which they are used. Different connector types have different characteristics, advantages, disadvantages, and performance parameters. However, all fiber optic cable connectors consist of the same four basic components.

The fiber optic cable mounts inside a first component called the ferrule. The ferrule is a long thin cylinder that is bored through the center at a diameter that is slightly larger than the diameter of the cladding of the fiber optic cable. The end of the fiber optic cable is located at the end of the ferrule. Ferrules are typically made of metal or ceramic, but may also be constructed of plastic.

A second component, the connector body or connector housing, holds the ferrule. The connector body is usually constructed of ceramic, metal, or plastic and includes one or more assembled pieces which hold the fiber optic cable in place. The details of connector body assemblies vary among connectors, but bonding and/or-crimping is commonly used to attach strength members and cable jackets to the connector body. The ferrule extends past the connector body to slip in a coupling device, described below.

The third component, the cable, attaches to the connector body, and acts as a point of entry for the fiber optic cable. Typically, a strain-relief boot is added over the junction between the cable and the connector body to provide extra strength to the junction.

Most fiber optic connectors do not use the male-female configuration common to electronic connectors. Instead, a coupling device (the fourth component), such as an alignment sleeve, is used to mate the connectors.

High loss optical connections limit the length and quality of fiber systems. Reflections created at the fiber optic cable connector can travel back towards the light transmitter and disrupt laser modulation, resulting in signal distortion. The goal of all connectors is low light loss and minimal back reflection.

The primary factors affecting the loss and reflective characteristics of a fiber optic cable connector are the fiber coupling alignment, and the contour of surface geometry of the end face of the optical fiber. The fiber optic cable must be aligned in a coupling device with minimum lateral and angular misalignment for maximum light transmission. The surface fiber end face must be free of scratches and pits for minimum reflection. The curvature and angle of the fiber and the connector's ferrule end surfaces must be of a magnitude that ensures physical contact and minimal back reflectance.

The final step in the termination of a fiber optic cable connector onto an optical fiber is the polishing of the fiber end face. Originally, this procedure was manually accomplished. A connector was placed in a polishing fixture so that its ferrule was slightly protruding from the fixture base surface. The fixture was then repetitively moved across an abrasive polishing film which removed fiber material until the desired scratch-free surface was attained. This procedure was time consuming and sensitive to the operator's individual touch.

Machines have been developed to automate the polishing process. While providing obvious advantages over manual polishing, conventional polishing machines have significant shortcomings regarding various steps in the polishing process. Conventional polishing machines are dependent upon the fiber optic cable connector's interlocking hardware for mounting onto the polishing work fixture. This limits the usefulness of a single work fixture for multiple connector styles. Currently, there are a multitude of connector styles, including SMA connectors, ST connectors, biconic connectors, FC connectors, D4 connectors, HMS-10 connectors (also known as Diamond connectors), SC connectors, LC connectors, fiber distributed data interface (FDDI) connectors, ESCON connectors, and EC/RACE connectors.

Increased labor and maintenance costs have necessitated a reduction in the time required to polish a fiber optic connector. The conventional polishing procedure involves multiple steps including the polishing of connectors on several types of polishing films. Minimizing these steps can greatly save time in the polishing operation.

Depending upon the application, some connectors require the fiber end face to be polished with a flat surface, other connectors require the fiber end face to be polished with an angled flat surface (preferably six-degree and eight-degree angles), while other connectors require the fiber end face to be polished with a conical end face. Moreover, the ferrules used in different connectors have different hardnesses. Thus, different connectors need to be polished at different angles with polishing surfaces and films having different hardnesses.

Conventional polishing machines use a single polishing surface and film, and thus, can only polish one type of connector at a time. Since different fiber optic cable connectors require fiber contact with different grits of polishing films and polishing surfaces, a machine with a single polishing surface and film will require the operator to change these surfaces and films several times during the complete process. Connectors having angled and conical fiber end faces further complicate the procedure because angled fixtures and different polishing pad hardnesses are required.

Using a single polishing pad and a variety of polishing films creates the potential for contamination from one connector type to another connector type. If the polishing film for one connector type contaminates the polishing pad (i.e., the pad is not sufficiently cleaned between connector polishing operations), there exists the potential for scratching a fiber end face of a connector. This is particularly true if the polishing film used for a connector having a ferrule with a hard material contaminates the polishing film used for connector having a ferrule with a softer material.

Furthermore, during a polishing operation, typically the connector moves on or traces a polishing pad in a pattern so that the connector never moves across the same portion of the polishing pad. Occasionally, however, a connector traverses over the same portion of the polishing pad. When this occurs, a connector trace overlap occurs. If connector trace overlap occurs, particulates of the hard connector ferrule may contaminate or mix with the polishing film or slurry and potentially scratch the relatively softer fiber end face.

Certain applications require a variety of fiber optic cable connectors to be used with a specific piece of fiber optic communications equipment. It is desirous to polish a complete set of connectors for a specific piece of fiber optic communications equipment with a single polishing apparatus. Unfortunately, with conventional polishing machines, an operator would have to polish a batch of one type of connector used in the set, and then change the polishing surface and film for the other connector types to be polished. Such a procedure is costly, time consuming, and may result in cross-contamination of polishing films between connectors.

Thus, there is a need in the art to for a polishing apparatus and method that polishes a variety of fiber optic cable connectors, having a variety of fiber end faces, eliminates the potential for contamination, reduces polishing process steps, and saves labor and maintenance costs.

SUMMARY OF THE INVENTION

The present invention solves the problems of the related art by providing an apparatus and method that polishes a variety of fiber optic cable connectors simultaneously. The apparatus of the present invention provides a plurality of polishing plates, each capable of holding its own polishing film and pad and having a varying height. The apparatus further provides a plurality of connector fixtures that may receive a variety of connectors at varying angles. Each connector fixture communicates with a corresponding polishing pad or section(s) thereof. Thus, fiber optic cable connectors having a variety of polished end faces may be provided with the apparatus of the present invention. The method of the present invention includes a plurality of steps for mass polishing of fiber optic cable connectors with varying patterns and loci of motion to substantially prevent overlap of polishing patterns during polishing (connector trace overlap). The apparatus and method of the present invention further eliminate the potential for contamination among polishing films, reduce polishing steps, and save labor and maintenance costs.

In accordance with the purpose of the invention, as embodied and broadly described herein, the invention comprises a method of simultaneously polishing a plurality of fiber optic cable connectors in a polishing apparatus having a base with a plurality of wedge-shaped areas each of which is aligned with a corresponding fiber optic cable connector, including: securing the plurality of fiber optic cable connectors in a fixture; imparting a relative motion between the fixture holding the plurality of fiber optic cable connectors and the base of the polishing apparatus; and controlling the relative motion so that each of the plurality of fiber optic cable connectors remains in a respective one of the wedge-shaped areas.

Further in accordance with the purpose of the invention, as embodied and broadly described herein, the invention comprises a method of simultaneously polishing a plurality of fiber optic cable connectors in a polishing apparatus having a base with a plurality of wedge-shaped areas each of which is aligned with a corresponding fiber optic cable connector, including: securing the plurality of fiber optic cable connectors in a fixture; applying alternating polishing media of different abrasivity to the wedge-shaped areas; imparting a relative motion between the fixture holding the plurality of fiber optic cable connectors and the wedge-shaped areas; and controlling the relative motion so that each of the plurality of fiber optic cable connectors remains in a respective one of the wedge-shaped areas.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description. It is to be understood that both the foregoing general description and the following detailed description are exemplary and explanatory only and are not restrictive of the invention, as claimed.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 5 is a schematic elevational view showing a fiber optic cable connector held perpendicular to a polishing pad shown in FIG. 1;

FIG. 6 is a schematic elevational view showing a fiber optic cable connector held at an angle to a polishing pad shown in FIG. 1;

FIG. 7 is a fragmental view of a ground fiber optic cable connector end face that has been polished on a hard or nonresilient polishing pad shown in FIG. 1;

FIG. 8 is a fragmental view of a ground fiber optic cable connector end face that has been polished on a resilient polishing pad shown in FIG. 1;

FIG. 9 is a top plan view of a polishing pad shown in FIG. 1 and showing an inventive locus of motion to polish the fiber optic cable connectors;

FIG. 10 is a top plan view of a polishing pad shown in FIG. 1 and showing an alternative inventive locus of motion to polish the fiber optic cable connectors;

DETAILED DESCRIPTION OF THE PREFERRED EMBODIMENTS

The following detailed description of the invention refers to the accompanying drawings. The same reference numbers in different drawings identify the same or similar elements. Also, the following detailed description does not limit the invention. Instead, the scope of the invention is defined by the appended claims and equivalents thereof.

Figure 1:
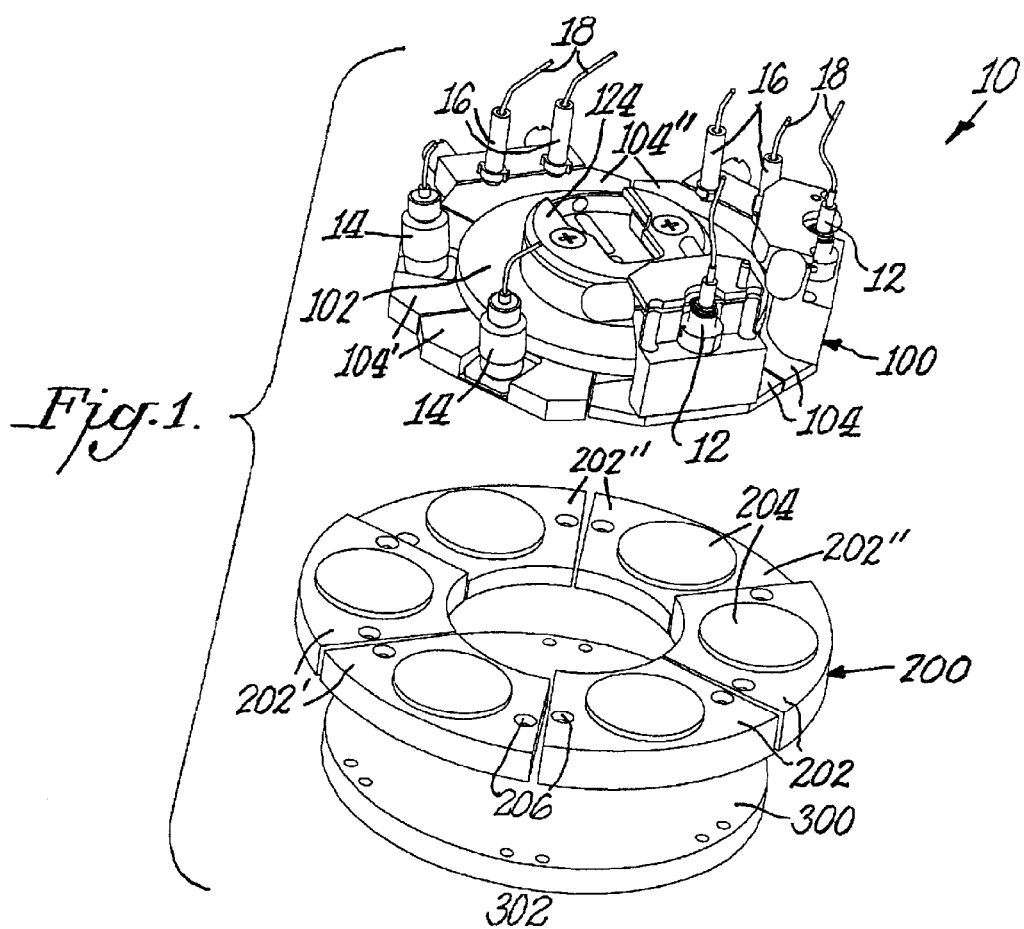
FIG. 1 is an exploded perspective view of a polishing fixture assembly and a polishing pad assembly for mass polishing of fiber optic cable connectors in accordance with an embodiment of the present invention.

Referring now specifically to the drawings, a hybrid fiber optic cable connector polishing apparatus according to the present invention is illustrated in FIG. 1, and shown generally as reference numeral 10. Hybrid polishing apparatus 10 includes a polishing fixture assembly 100, a polishing pad assembly 200, and a base 300. Polishing fixture assembly 100 has a connector hub 102 that interconnects with a plurality of segment pairs that receive and hold a variety of fiber optic cable connector types. A first pair of segments 104 receive and hold a first fiber optic cable connector type 12, a second pair of segments 104' receive and hold a second fiber optic cable connector type 14, and a third pair of segments 104" receive and hold a third fiber optic cable connector type 16.

Polishing pad assembly 200 includes a plurality of wedge pairs that align with a corresponding segment pair of polishing fixture assembly 100. Each wedge may have a polishing pad 204 mounted thereon via conventional mounting means. Alternatively, a wedge may not have a polishing pad, and thus itself may be used as the polishing pad. Although each polishing pad 204 is shown as being circular, polishing pads 204 may have different shapes, including but not limited to elliptical, square, rectangular, or the same shape as its corresponding wedge.

A first pair of wedges 202 align with first pair of segments 104, a second pair of wedge 202' align with second pair of segments 104', and a third pair of wedges 202" align with third pair of segments 104". As shown in FIG. 1, each wedge pair may have a different thickness, although the thicknesses of wedges 202 are exaggerated in FIG. 1. For example, wedges 202 are thicker than wedges 202', which are thicker than wedges 202". Since polishing fixture assembly 100 is provided a uniform distance above polishing pad assembly 200, the thicker the wedge, the greater the force applied to the polishing pad 204 provided on the wedge. The thickness of the wedges may also depend upon the material, the shape of the ferrules, the configuration of the connectors to be polished thereon, whether a polishing pad 204 is used, and/or whether other polishing media are used.

Each wedge 202, 202', 202", may have a pair of holes 206 that align with holes 302 provided in base 300 for provision of a connecting means therethrough that connects wedges 202, 202', 202" to base 300. Connecting means may be any conventional type of connection means, including but not limited to screws, nuts and bolts, and pins.

Although pairs of segments and wedges are shown in FIG. 1, the hybrid polisher apparatus of the present invention may have distinct wedges and segments, and thus polish a greater number of distinct fiber optic cable connector types than segment/wedge pairing allows. Furthermore, the hybrid polishing apparatus of the present invention shown in FIG. 1 includes six wedges, polishing pads, and segments, but may include more or less wedges, polishing pads, and segments. Preferably, hybrid polishing apparatus 10 has at least two wedges, two polishing pads, and two segments. The upper limit of wedges, pads, and segments should not effect the polishing capabilities of apparatus 10. For example, the upper limit should not be so great that the polishing pads are too small to effectively polish the fiber optic cable connectors. Of course, increasing the size of hybrid polishing apparatus 10 would increase the number of wedges, segments, polishing pads, and connectors that may be used with the present invention.

Figure 2:
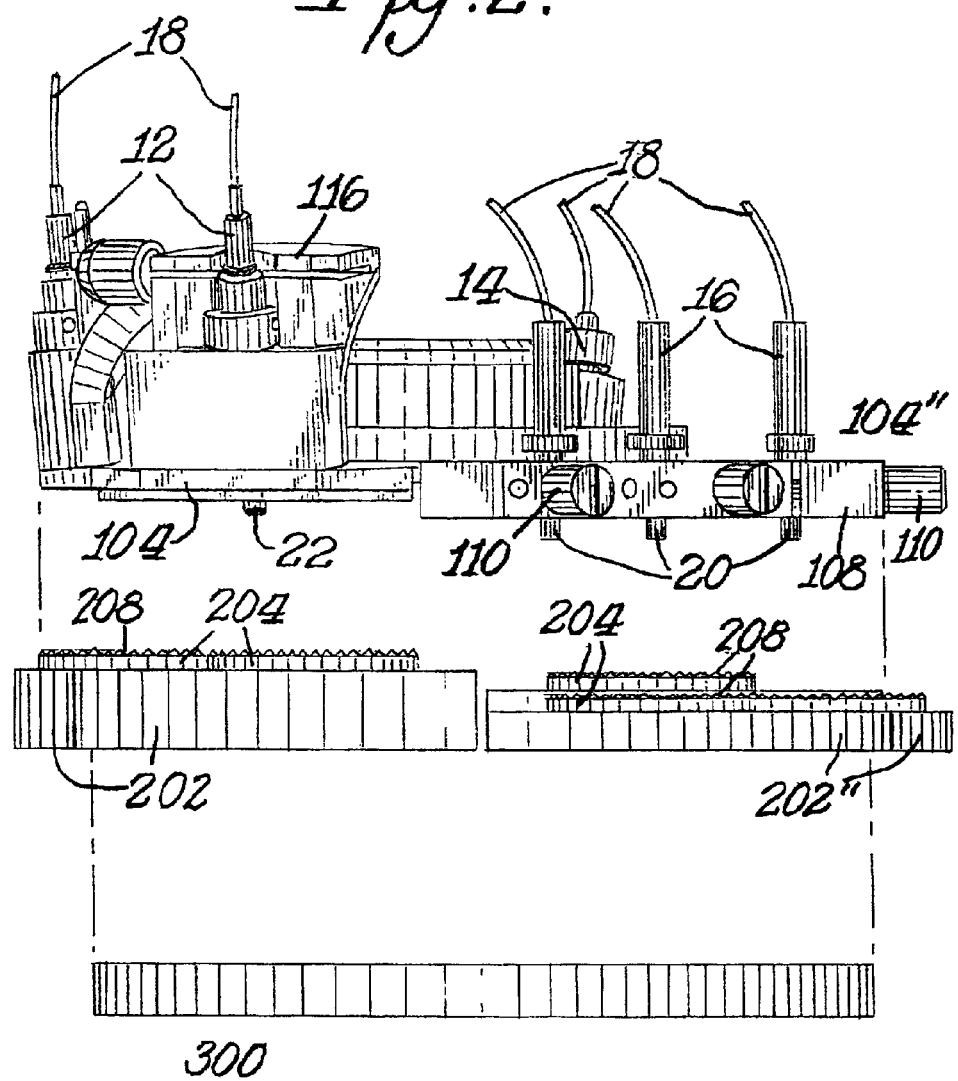
FIG. 2 is an exploded side elevational view of the polishing fixture assembly and the polishing pad assembly shown in FIG. 1.

FIG. 2 is an exploded side elevational view of hybrid polishing apparatus 10 shown in FIG. 1. As shown, fiber optic cables 18 connect to first connector types 12, and are housed by ferrules 22 that extend through connector 12 and segments 104. Fiber optic cables 18 connect to third connector types 16, and are housed by ferrules 20 that extend through connectors 16 and segments 104". Although not clearly shown, fiber optic cables 18 also connect to second connector types 14, and are housed by ferrules (similar to ferrules 20, 22) that extend through connectors 14 and segments 104".

As best shown in FIGS. 5 and 6, a polishing film 214 may be provided on polishing pads 204. Polishing film 214 may be any conventional polishing film used to polish fiber optic cable connectors. Polishing film 214 is selected to match the connector being polished. A conventional polishing slurry 208 may also be provided on polishing film 214 or may be used instead of polishing film 214.

Figure 3:
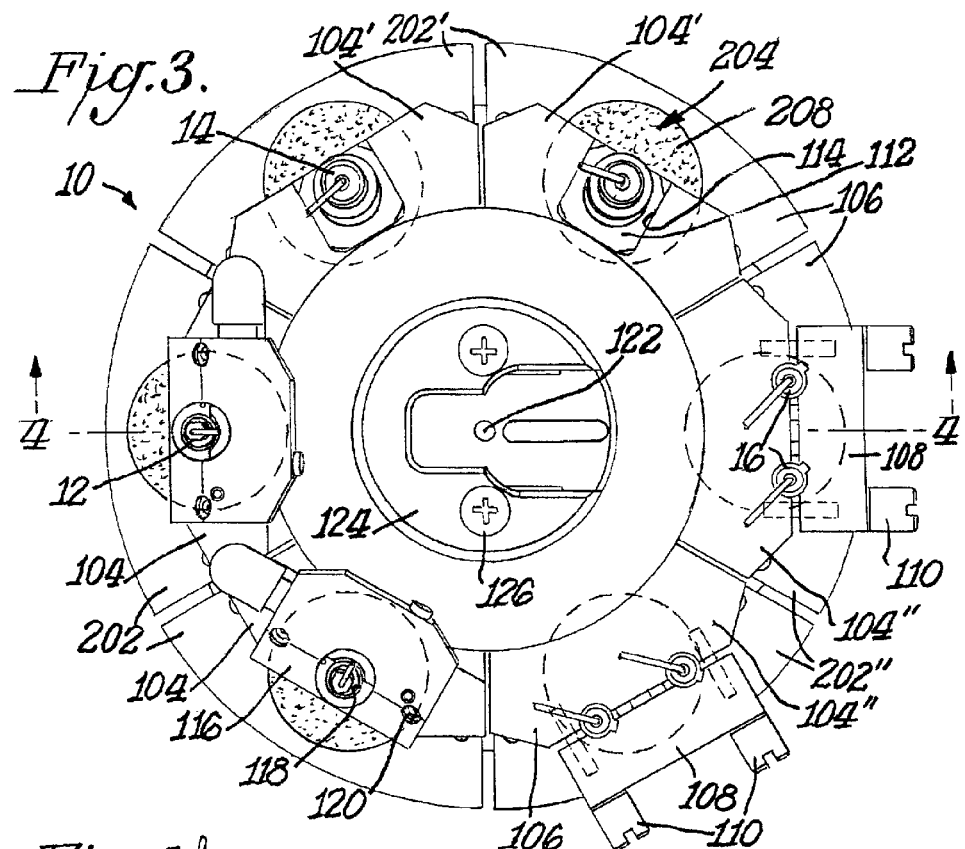
FIG. 3 is top elevational view of the polishing fixture and pad assemblies shown in FIG. 1, and showing three different pairs of clamps for holding fiber optic cable connectors.

FIG. 3 is a top elevational view of hybrid polishing apparatus 10 of the present invention. Each segment of polishing fixture assembly 100 includes a base portion 106 and a means for attaching a fiber optic cable connector to base portion 106. The attaching means varies for each segment pair, since different connector types are attached to each segment pair. Each of the first pair of segments 104 includes a clamp 116 having an opening 118 provided therein and a means for fixing clamp 116 to base portion 106. Fixing means 120 may be any conventional type of connection means, including but not limited to screws, nuts and bolts, and pins. Opening 118 receives and holds first fiber optic cable connector type 12 in clamp 116. Base portion 106 also has an opening provided therein through which a portion of connector type 12 and its fiber optic cable 18 and ferrule extend. Opening 118 and opening in base portion 106 may be provided at a predetermined angle to the surface of polishing pad 204 so that the end face of fiber optic cable 18 and its ferrule may be polished at an angle. The predetermined angle is best shown in FIG. 6 as reference numeral A, and may be any angle depending upon the application to be used with the connector. Preferably, predetermined angle A is six degrees for first fiber optic cable connector type 12.

Each of the second pair of segments 104' includes a recess 112 having an opening 114 provided therein for receiving and holding second fiber optic cable connector type 14. Base portion 106 also has an opening provided therein through which a portion of connector type 14 and its fiber optic cable 18 and ferrule extend. Opening 114 and opening in base portion 106 may be provided at predetermined angle A to the surface of polishing pad 204 so that the end face of fiber optic cable 18 and its ferrule may be polished at an angle. Although predetermined angle A may vary depending upon the application, predetermined angle A is preferably eight degrees for second fiber optic cable connector type 14.

Each of the third pair of segments 104" includes a clamp 108 and screw 110 assembly that receives and holds a pair of third fiber optic cable connector types 16 against base portion 106. Screws 110 may be rotated in one direction to engage connector types 16 against base portion 106. A portion of the pair of connector types 16 and its fiber optic cable 18 and ferrule extend between clamp 108 and base portion 106. Clamp 108 and base portion 106 may hold connector types 16 at predetermined angle A to the surface of polishing pad 204 so that the end face of fiber optic cable 18 and its ferrule may be polished at an angle. Although predetermined angle A may vary depending upon the application, predetermined angle A is preferably zero degrees for third fiber optic cable connector types 16, i.e., connector types 16 are held perpendicular to the surface of polishing pad 204.

As further shown in FIG. 3, a cap 124 is affixed to connector hub 102 via pair of screws 126. Cap 124 has a hole 122 provided therein for receiving a mounting fixture that holds polishing fixture assembly 100 fixed and at a predetermined height from the polishing pad assembly 200.

Figure 4:
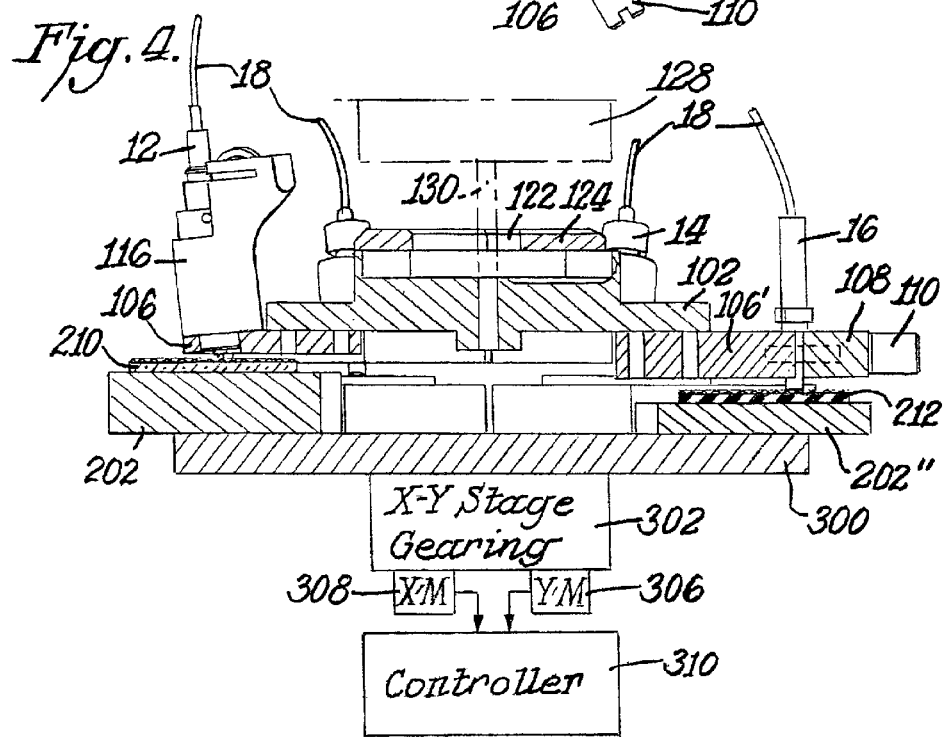
FIG. 4 is cross-sectional view in elevation taken along line 4—4 of FIG. 3.

FIG. 4 is cross-sectional view in elevation of hybrid polishing apparatus 10, taken along line 4—4 of FIG. 3. As shown, a mounting fixture 128 is provided above polishing fixture assembly 100 and has a shaft 130 extending therefrom. Shaft 130 extends through hole 122 of cap 124 and an opening provided at the center of connector hub 102. Mounting fixture 128 and shaft 130 hold polishing fixture assembly 100 fixed against polishing pad assembly 200 until a desired pressure between the two is achieved.

As further shown in FIG. 4, the polishing pads may be made of a nonresilient (e.g., hard) material 210 such as glass, ceramic, or the like, or a resilient (e.g., soft) material 212 such as rubber (natural and synthetic), thermoplastic, or the like. Hard and resilient polishing pads 210, 212 provide different end face geometries to fiber optic cable 18, as described below. Although hard polishing pad 210 is shown being provided on thick wedges 202, and resilient polishing pad 212 is shown being provided on thin wedges 202'', either type of polishing pad 210, 212 may be provided on any type of wedge 202, 202', and 202''.

As further shown in FIG. 4, X-Y stage 302 is attached to base 300 on one side, and an Y-motor 306 and an X-motor 308 on its other side. X-Y stage 302, via X-motor 306 and Y-motor 308, move base 300 and polishing pad assembly 200 in a predetermined pattern relative to the stationary polishing fixture assembly 100, as described more fully below. X-motor 306 moves X-Y stage 302 back and forth in an x-direction, and Y-motor 308 moves X-Y stage 302 back and forth in a y-direction (perpendicular to the x-direction), in response to control signals provided by a conventional controller 310, such as a programmable logic controller (PLC), a general purpose personal computer programmed with control software, etc.

Although a polishing pad assembly 200 having wedges 202 is preferable, polishing pad assembly 200 may also be made from of a singular disk that holds the polishing pads 204. Such a disk would have a plurality of sections, with each section holding a corresponding polishing pad 204. The thickness of each section of the singular disk may be varied, similar to the way the thicknesses of wedges 202 are varied. Furthermore, as may be the case with wedges 202, the sections of the singular disk need not have polishing pads 204. Instead, each section of the singular disk may function as a polishing pad.

Also, a single polishing pad 204 may be laid on singular disk pad assembly 200. Wedge-shaped areas may be delineated by an embossed polishing film laid directly on base 300 or assembly 200.

FIG. 5 is a schematic elevational view showing fiber optic cable 18 and ferrule 20 held perpendicular to hard polishing pad 210 provided on wedge 202. Polishing film 214 is provided on a top surface of hard polishing pad 210, and polishing slurry 208 may be provided on polishing film 214. The combination of hard polishing pad 210 and polishing medium or media (e.g., polishing film 214 and polishing slurry 208) provides a smooth flat end face 22 to fiber optic cable 18 and ferrule 20, as shown in FIG. 7. If fiber optic cable 18 and ferrule 20 are held at predetermined angle A (as shown in FIG. 6) to the surface of hard polishing pad 210, an angled flat end face 24 is provided in fiber optic cable 18 and ferrule 20, as shown in phantom in FIG. 7. If hard polishing pad 210 is replaced with resilient polishing pad 212 (shown in FIG. 6) and fiber optic cable 18 and ferrule 20 are held perpendicular to resilient polishing pad 212, the combination of resilient polishing pad 212 and polishing medium or media (e.g., polishing film 214 and polishing slurry 208) provides a conical end face 22 to fiber optic cable 18 and ferrule 20, as shown in FIG. 8.

FIG. 9 is a top plan view of one of the polishing pads 204 shown in FIG. 1 and showing each of the pads 204 moving in a figure eight pattern 28 to polish the end faces of a fiber optic cables 18 and ferrules 20 of fiber connectors 12, 14, 16. Each of the polishing pads 204 will simultaneously move in the figure eight pattern 28 shown in FIG. 9 through movement of the X-Y stage 302, while fiber connectors 12, 14, 16 are maintained stationary by polishing fixture assembly 100. The loci of motion of figure eight patterns 28 may also rotate in increments to prevent overlap of one figure eight pattern over another figure eight pattern, and substantially prevent connector trace overlap. Preferably, the loci of motion rotate in increments until figure eight patterns 28 have rotated almost one-hundred and eighty degrees, but may rotate less than this if the polishing process is complete. The incremental rotation of figure eight patterns 28 may vary, but preferably is sufficient to prevent connector trace overlap.

The background mentions a common connector trace overlap problem recognized in the art in which particulates of a connector ferrule left on a polishing film can scratch the relatively softer fiber end face if the fiber end face traces over these particulates.

Because the invention seeks to solve the problem of polishing different types of connectors having different hardnesses, the invention faces a different and more serious connector trace overlap problem. Namely, when a hard (e.g. ceramic) connector is polished it will leave behind a connector trace. These hard particles will scratch a relatively softer connector (e.g. plastic) if the soft connector polishing trace overlaps the hard connector polishing trace. Thus, if one simply tries to load different connector types having different hardnesses into a polisher and uses conventional loci of motion then the fiber end face and ferrule may be scratched due to connector trace overlap. This problem is solved by the inventive loci of motion.

FIG. 10 is atop plan view of one of the polishing pads 204 shown in FIG. 1 and showing each of the pads 204 moving in an elliptical pattern 30 to polish the end faces of fiber optic cables 18 and ferrules 20 of fiber connectors 12, 14, 16. Each of the polishing pads 204 will simultaneously move in the elliptical pattern 30 shown in FIG. 10 through movement of the X-Y stage 302, while fiber connectors 12, 14, 16 are maintained stationary by polishing fixture assembly 100. The loci of motion of elliptical patterns 30 may also rotate in increments to prevent overlap of one elliptical pattern over another elliptical pattern. Preferably, the loci of motion rotate in increments until elliptical patterns 30 have rotated almost one-hundred and eighty degrees, but may rotate less than this if the polishing process is complete. The incremental rotation of elliptical patterns 30 may vary, but preferably is sufficient to prevent connector trace overlap.

Although FIGS. 9 and 10 show two polishing patterns, the present invention may be used with a variety of conventional of future-developed polishing patterns. For example, a spirographic pattern may be achieved with the present invention. Any such polishing pattern may be adapted to the invention by tracing the pattern within the wedge-shaped area (e.g., defined by the individual segments or wedges or embossed film).

Polishing apparatus 10 may be used in a method of simultaneously polishing a plurality of fiber optic cable connectors 12, 14, 16, in accordance with an embodiment of the present invention. Such a method would involve securing the plurality of connectors in a segment 104 of polishing fixture assembly 100. A relative motion may then be imparted between polishing fixture assembly 100 and the base 300 of the polishing apparatus 10. The relative motion is controlled so that each of the fiber optic cable connectors remains in its respective wedge-shaped area defined by wedge 202. The relative motion may be a predetermined pattern, such as figure eight pattern 28 or elliptical pattern 30 shown in FIGS. 9 and 10. The predetermined pattern may also be a rotating locus of motion rotating within each of the wedge-shaped areas defined by wedge 202.

Figure 11:
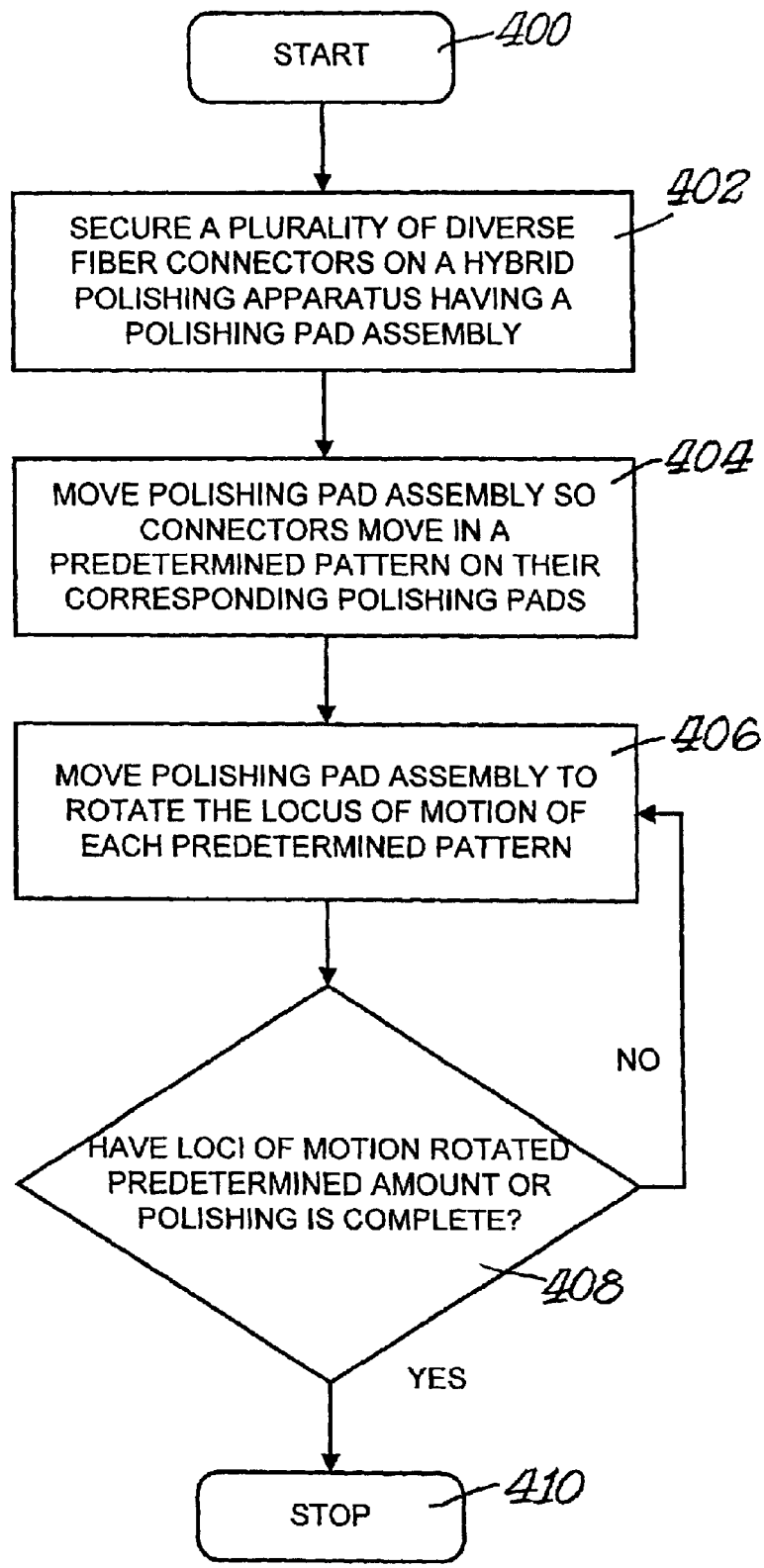
FIG. 11 is a flow chart showing a method for mass polishing of fiber optic cable connectors in accordance with an embodiment of the present invention.

FIG. 11 is a flow chart showing a method for mass polishing of fiber optic cable connectors using hybrid polishing apparatus 10 of the present invention. The method shown in FIG. 11 may be used to polish fiber optic cable connectors in predetermined patterns, such as the figure eight patterns 28 shown in FIG. 9 or the elliptical patterns 30 shown in FIG. 10, as well as the other patterns discussed above. In a first step 400 the method begins, and is followed by a second step 402 wherein a plurality of diverse fiber optic cable connectors are secured in hybrid polishing apparatus 10 having polishing pad assembly 200. In a next step 404, the polishing pad assembly 200 is moved so the connectors move in predetermined patterns on their corresponding polishing pads 204. Subsequently, in step 406, polishing pad assembly 200 is moved to rotate the loci of motion of the predetermined patterns and prevent overlap of patterns. In step 408, there is check to see if the loci of motion of the patterns have rotated a predetermined amount (e.g., less than one-hundred and eighty degrees) or if polishing is complete. If the loci of motion has rotated the predetermined amount or polishing is complete, then the method is stopped at step 410, otherwise step 406 is repeated and polishing pad assembly 200 is moved once again.

The method shown in FIG. 11 and the loci of motion shown in FIGS. 9 and 10 are alone sufficient to polish diverse connector types without all of the elements of the hybrid polishing apparatus 10 described herein. A conventional polishing apparatus with polishing fixture assembly 100 or equivalent fixture controlled by the inventive methods or loci of motion is sufficient to prevent connector trace overlap of diverse connector types.

Figure 12:
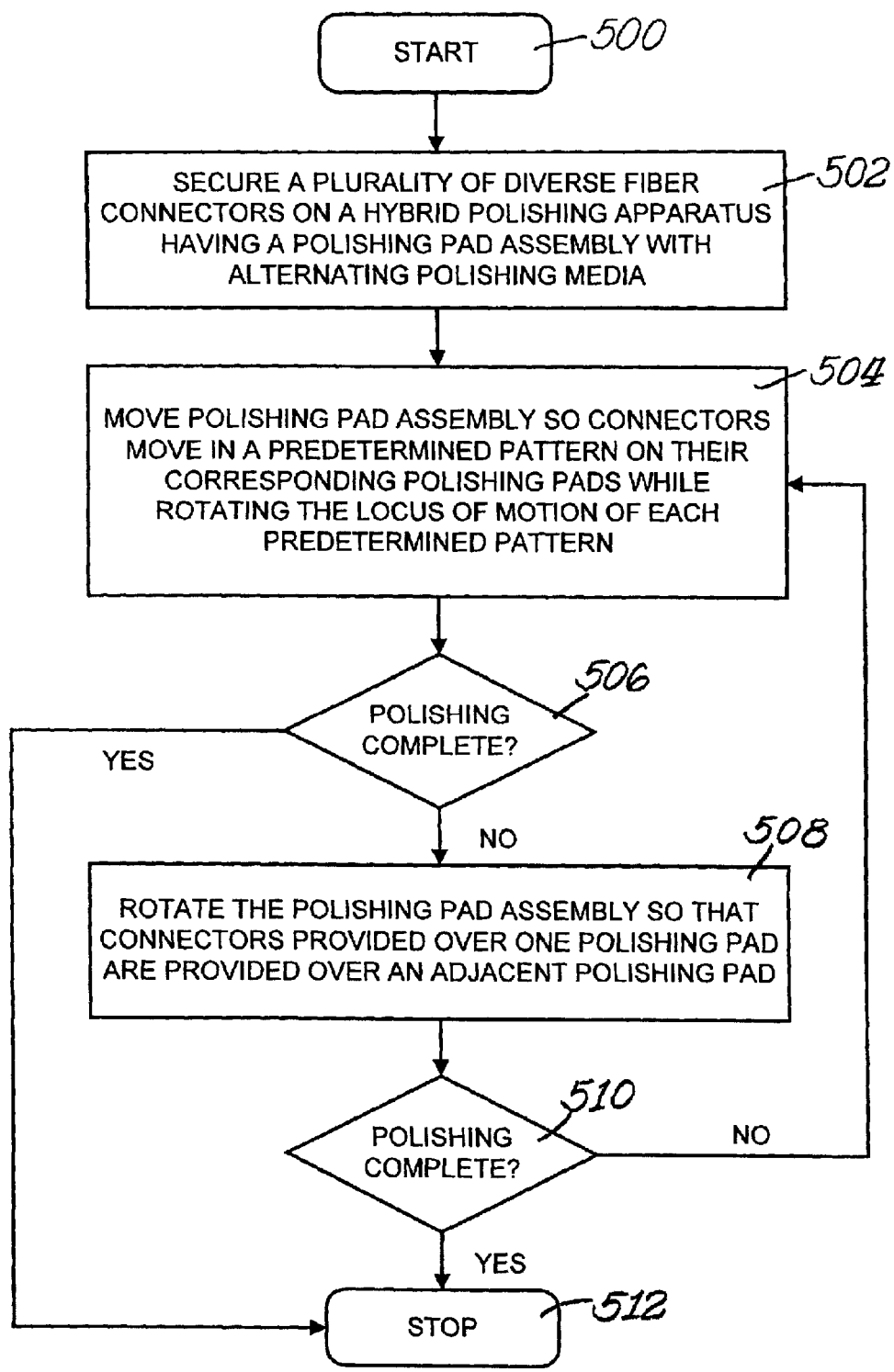
FIG. 12 is a flow chart showing an alternative method for mass polishing of fiber optic cable connectors in accordance with an embodiment of the present invention.

An alternative method for polishing fiber optic cable connectors may include the steps delineated above in FIG. 11, but may further include additional steps as set forth in FIG. 12. First, alternating polishing pads 204 (or wedges 202 if pads 204 are not used) may have different polishing media (e.g., polishing film 214 and/or polishing slurry 208). The polishing media may have different abrasivities, e.g., coarse, medium, or fine, as those terms are understood in the polishing art. Thus, a polishing pad having one media (coarse, medium, or fine) may be adjacent to two polishing pads having a different media, or a pad having one media may be adjacent to two dummy wedges. Dummy wedges may not have a polishing pad and should not impart a polish on connectors.

Different combinations of polishing media may be used. For example, assuming six polishing pads 204 are provided: (1) alternating coarse and fine polishing media may be provided; (2) alternating coarse and medium polishing media may be provided; (3) alternating medium and fine polishing media may be provided; (4) coarse, medium, fine, coarse, medium, and fine media may be provided; as well as other combinations.

The alternative method simultaneously polishes a plurality of fiber optic cable connectors 12, 14, 16 in polishing apparatus 10. After securing the connectors in polishing fixture assembly 100, alternative polishing media of different abrasivity are applied to wedges 202. A relative motion may then be imparted between polishing fixture assembly 100 and the base 300 of the polishing apparatus 10. The relative motion is controlled so that each of the fiber optic cable connectors remains in its respective wedge-shaped area defined by wedge 202. The relative motion may be a predetermined pattern, such as figure eight pattern 28 or elliptical pattern 30 shown in FIGS. 9 and 10. The predetermined pattern may also be a rotating locus of motion rotating within each of the wedge-shaped areas defined by wedge 202.

More specifically, as shown in FIG. 12, the alternative method begins at step 500, and is followed by step 502 where a plurality of diverse connectors are secured on a hybrid polishing apparatus having a polishing pad assembly with alternating polishing pads of different polishing media. At step 504, the polishing pad assembly is moved so that the connectors will move in predetermined patterns on their corresponding polishing pads, while the loci of motion of the patterns are rotated. Step 506 checks to see if polishing is complete. If polishing is complete, the process is terminated at step 512, otherwise step 508 is performed and polishing pad assembly 200 is rotated so that the connectors previously provided over one polishing pad (or dummy wedge), may be provided over its adjacent polishing pad (or dummy wedge). Step 510 checks to see if polishing is complete. If polishing is complete, the process is terminates, otherwise the method returns to step 504.

This way a connector may be: (1) polished with coarse polishing medium and then with medium or fine polishing media, and vice versa; (2) polished with a coarse polishing medium, then a medium polishing medium, and then with a fine polishing medium, or any combination of the three polishing media; (3) polished with a coarse, medium, or fine polishing medium, and then not polished by a dummy wedge; or (4) not polished by a dummy wedge, and then polished with a coarse, medium, or fine polishing medium.

The combinations of polishing media is dependent upon the number of wedges of apparatus 10, as well as the number of connectors loaded into the polishing fixture assembly. For example, if one connector or connector set is provided and aligned over one wedge and there are six wedges provided, then the connector or connector set may be polished in two to six steps as the polishing pad assembly rotates to align two, three, four, five or six wedges with the connector or connector types. If a connector or connector set is aligned over two wedges and there are six wedges provided, then connector or connector set may be polished in two to three steps as polishing pad assembly rotates to align first, second, and third pairs of wedges with the connector pairs or connector set pairs.

The removable nature of the wedges of polishing pad assembly 200 and the segments of polishing fixture assembly 100, enables a large variety of combinations of wedges and segments. The different types of polishing pads, films, and slurries further increases the variety of combinations. A few of the combinations will be discussed herein, but other combinations are possible with the present invention.

For example, each of the pairs of wedges, segments, and pads shown in the FIGS. shows each wedge, segment, or pad of the pair being adjacent to one another. However, the pairings of wedges, segments, and pads need not be adjacent to another. They may also be nonadjacent, such as opposite to one another or have another wedge, segment, or pad between them. Furthermore, there need not be wedge, segment or pad pairs, but rather, six distinct wedges, segments, and pads may be provided. The wedges, segments, and pads may be grouped in a variety of ways, for example, there may be: (1) a first group having one wedge and one segment and one pad of one type, and a second group having five wedges and five segments and five pads of a different type; (2) a first group having two wedges and two segments and two pads of one type, and a second group having four wedges and four segments and four pads of a different type; (3) a first group having three wedges and three segments and three pads of one type, and a second group having three wedges and three segments and three pads of a different type; and (4) a first group having two wedges and two segments and two pads of one type, a second group having two wedges and two segments and two pads of another type, and third group having two wedges and two segments and two pads of still another type. Such groupings are based on the assumption that there are six wedges, segments, and pads, but may vary since, as noted above, the polishing apparatus is not limited to six wedges, segments, or pads.

Finally, the wedges and segments need not be of equal dimensions. For example, a wedge may be the same size as two wedges 202 combined, and hold two polishing pads 204 thereon, or a wedge may be the same size as three wedges 202 combined, and hold three polishing pads 204 thereon. The same holds true for the segments.

It will be apparent to those skilled in the art that various modifications and variations can be made in the hybrid fiber optic cable connector polishing apparatus and method of the present invention and in construction of the apparatus and method without departing from the scope or spirit of the invention. For example, although polishing fixture assembly 100 is shown as being stationary, and polishing pad assembly 200 is shown as moving in the FIGS., polishing fixture assembly 100 may be moveable, and polishing pad assembly 200 may be stationary. Other examples of other modifications and variations to the present invention have been previously provided.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of simultaneously polishing a plurality of fiber optic cable connectors in a polishing apparatus having a base with a plurality of wedge-shaped areas each of said plurality of wedge-shaped areas being aligned with a corresponding one of said plurality of fiber optic cable connectors, comprising the steps of:

securing the plurality of fiber optic cable connectors in a fixture;

imparting a relative motion between the fixture holding the plurality of fiber optic cable connectors and the base of the polishing apparatus; and controlling the relative motion so that each one of the plurality of fiber optic cable connectors remains in a respective one of the wedge-shaped areas.

2. A method as recited in claim 1, wherein said step of controlling relative motion imparts the relative motion in a predetermined pattern.

3. A method as recited in claim 2, wherein said step of controlling relative motion controls the relative motion such that the predetermined pattern is a rotating locus of motion rotating within each of the wedge-shaped areas.

4. A method as recited in claim 1, wherein the plurality of fiber optic cable connectors include at least two different types of fiber optic cable connectors.

5. A method as recited in claim 1, further comprising the steps of:

providing polishing pads in the wedge-shaped areas;

applying a polishing medium to the polishing pads; and polishing each fiber optical cable connector with the polishing medium and a corresponding one of the polishing pads.

6. A method as recited in claim 5, further comprising the step of:

stopping the method if polishing is completed of the predetermined pattern is completed.

7. A method as recited in claim 2, wherein the predetermined pattern is a figure eight.

8. A method as recited in claim 2, wherein the predetermined pattern is elliptical.

9. A method as recited in claim 2, wherein said step of controlling relative motion substantially prevents connector trace overlap.

10. A method of simultaneously polishing a plurality of fiber optic cable connectors in a polishing apparatus having a base with a plurality of wedge-shaped areas each of said plurality of wedge-shaped areas being aligned with a corresponding one of said plurality of fiber optic cable connectors, comprising the steps of:

securing the plurality of fiber optic cable connectors in a fixture;

applying alternating polishing media of different abrasivity to the wedge-shaped areas;

imparting a relative motion between the fixture holding the plurality of fiber optic cable connectors and the wedge-shaped areas; and controlling the relative motion so that each of the plurality of fiber optic cable connectors remains in a respective one of the wedge-shaped areas.

11. A method according to claim 10, wherein said step of applying alternating polishing media applies a first and a second polishing media having different aberasivities to respective ones of said plurality of wedge-shaped areas.

12. A method according to claim 11, further comprising the steps of:

rotating the base relative to the fixture so that the plurality of fiber optic cable connectors are aligned with different ones of said plurality of wedge-shaped areas having polishing media with different abrasivities; and repeating said steps of imparting relative motion and said controlling the relative motion.

13. A method according to claim 10, wherein said applying alternating polishing media applies a first, a second, and a third polishing media having different absrasivities to respective ones of said plurality of wedge-shape areas.

14. A method according to claim 13, further comprising the steps of:

rotating the base relative to the fixture so that the plurality of fiber optic cable connectors are aligned with different ones of said plurality of wedge-shaped areas having polishing media with different abrasivities;

repeating said steps of imparting relative motion and said controlling the relative motion;

rotating the base relative to the fixture so that the plurality of fiber optic cable connectors are aligned with different ones of said plurality of wedge-shaped areas having polishing media with different abrasivities; and repeating said steps of imparting relative motion and said controlling the relative motion.

15. A method according to claim 10, wherein said applying alternating polishing media applies N polishing media having different absrasivities to respective wedge-shape areas.

16. A method according to claim 15, further comprising the steps of:
rotating the base relative to the fixture so that the plurality of fiber optic cable connectors are aligned with different ones of said plurality of wedge-shaped areas having polishing media with different abrasivities; and
repeating said said steps of imparting relative motion, said controlling the relative motion and said rotating the base (N−1) times.

17. A method according to claim 10, wherein the polishing media includes a polishing film and/or a polishing slurry.

18. A method according to claim 10, further comprising the step of:
providing polishing pads in the plurality of wedge-shaped areas, wherein said applying alternating polishing media applies the alternating polishing media to the polishing pads.

19. A method as recited in claim 10, wherein the plurality of fiber optic cable connectors include at least two different types of fiber optic cable connectors.

20. A method as recited in claim 10, wherein said controlling relative motion substantially prevents connector trace overlap.

21. A method as recited in claim 10, wherein said step of controlling relative motion imparts the relative motion in a predetermined pattern.

22. A method as recited in claim 21, wherein said step of controlling relative motion controls the relative motion such that the predetermined pattern is a rotating locus of motion rotating within each of the wedge-shapes areas.

23. A method as recited in claim 21, wherein the predetermined pattern is a figure eight.

24. A method as recited in claim 21, wherein the predetermined pattern is elliptical.

* * * * *